United States Patent [19]

Lewis

[11] 4,403,053

[45] Sep. 6, 1983

[54] STABILIZED OLEFIN POLYMERS

[75] Inventor: Elyse B. Lewis, Williamstown, W. Va.

[73] Assignee: Borg-Warner Corporation, Chicago, Ill.

[21] Appl. No.: 375,947

[22] Filed: May 7, 1982

[51] Int. Cl.$^3$ ............................ C08K 5/34; C08K 5/52
[52] U.S. Cl. ........................................ 524/91; 524/120
[58] Field of Search .................................. 524/91, 120

[56] References Cited

U.S. PATENT DOCUMENTS

| 3,039,993 | 6/1962 | Friedman | 524/120 |
| 3,322,718 | 5/1967 | Jacob | 524/91 |
| 4,206,111 | 6/1980 | Valdiserri et al. | 524/91 |
| 4,302,383 | 11/1981 | Valdiserri et al. | 524/120 |
| 4,305,866 | 12/1981 | York et al. | 524/120 |

FOREIGN PATENT DOCUMENTS 1526603  9/1978  United Kingdom .

*Primary Examiner*—John Kight, III
*Assistant Examiner*—R. A. White
*Attorney, Agent, or Firm*—Joseph Shekleton

[57] ABSTRACT

An ultraviolet stabilizer for olefin polymers. It is a combination of a 2-hydroxyphenylbenzotriazole, a bis-(dialkylphenyl)pentaerythritol diphosphite.

8 Claims, No Drawings

STABILIZED OLEFIN POLYMERS

This invention relates as indicated to stabilized polyolefins. More particularly it relates to such polyolefins as are stabilized against deterioration which ordinarily results from prolonged exposure to ultraviolet light. Still more particularly, it relates to the stabilization of polyolefins as above by means of small proportions of certain additives.

BACKGROUND OF THE INVENTION

Ultraviolet light has a degradative effect on olefin polymers, the severity of which is dependent on the particular polymer and the geographical location of exposure. The degradation may take the form of discoloration, loss of tensile and impact strength, distortion of initial flexibility, dimensional change, surface craze, cracking, powdering or increased electrical conductivity. All of these effects may result from the breaking of carbon-to-carbon bonds in the polymer chain followed by immediate oxidation of the chain fragments.

It is well known that the addition of certain materials to an olefin polymer will impart a degree of stabilization to that polymer with respect to its resistance to the destructive forces of ultraviolet radiation. These materials, in one instance, function as preferential acceptors of incident ultraviolet radiation because they have a much higher affinity for such radiation than does the olefin polymer. It appears that they absorb harmful radiation and dissipate it as harmless energy. They thus form a protective shield for the polymer in which they are present.

Although there are many types of ultraviolet stabilizers, an important class includes the 2-hydroxyphenylbenzotriazoles. They offer strong intensity and broad ultraviolet stabilization with a fairly sharp wavelength limit close to the visible region. They absorb light at 280-390 mm. which is the spectral region most harmful to polymer claims.

Olefin polymers which are stabilized by an ultraviolet stabilizer frequently contain also an oxidation inhibitor. This is especially so where it is important to achieve light stable polymer compositions. A wide variety of antioxidants are available.

U.S. Pat. No. 4,206,111 (Valdiserri et al.) shows the combination of certain 2-hydroxyphenylbenzotriazoles, dialkylpentaerythritol diphosphites and phenolic ester oxidation inhibitors. The combination is an effective ultraviolet stabilizer in olefin polymers, being effective to extend the useful life of polypropylene, for example.

U.K. Pat. No. 1,526,603 shows a process for preparing bis-(dialkylphenyl)pentaerythritol diphosphates; also shown is the use of such disphosphites in combination with a phenolic inhibitor to impart an enhanced thermal stability to polypropylene.

SUMMARY OF THE INVENTION

It has been found that the effectiveness of certain 2-hydroxyphenylbenzotriazoles as ultraviolet stabilizers in olefin polymers is unexpectedly enhanced by the presence of small proportions of a bis-(dialkylphenyl)-pentaerythritol diphosphite. The combination of these additives is effective to extend significantly by the useful life of polypropylene, for example, by many hours in a Weather-Ometer.

DESCRIPTION OF THE PREFERRED EMBODIMENTS

The olefin polymers include homopolymers and copolymers of monoolefins, preferably those monoolefins containing 1-4 carbon atoms. Illustrative examples include polyethylene (including low density, high density, ultra high molecular weight and linear low density polyethylene), polypropylene, EPDM polymers, ethylene-propylene copolymers and polyisobutylene. The stabilization of mixtures of any of these olefin polymers and copolymers likewise is contemplated.

The 2-hydroxyphenylbenzotriazoles contemplated herein are those which conform to the structural formula

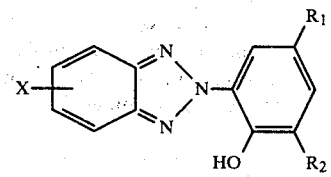

where $R_1$ is lower alkyl or halogen (preferably chlorine), $R_2$ is lower alkyl, halogen (preferably chlorine) or hydrogen, and X is chlorine or hydrogen.

Illustrative examples of such 2-hydroxyphenylbenzotriazoles include 2(2'-hydroxy-3',5'-ditertiarybutyl-phenyl)5-chlorobenzotriazole (Tinuvin 327), 2-(2'-hydroxy-3',5'-dimethylphenyl)benzotriazole, 2-(2'-hydroxy-5'-tertiarybutylphenyl)benzotriazole, 2-(2'-hydroxy-3'-tertiarybutyl-5'-methylphenyl)benzotriazole (Tinuvin 326), 2-(2'-hydroxy-5-methylphenyl)-benzotriazole (Tinuvin P), 2-(2'hydroxy-3', 5'-dimethylphenyl)5-chlorobenzotriazole, 2-(2'-hydroxy-3',5'-ditertiary-octylphenyl)benzotriazole (Tinuvin 328), 2-(2'-hydroxy-3',5'-dichlorophenyl)benzotriazole, and (2-(2'-hydroxy-3'-methyl-5'-tertiaryoctylphenyl)benzotriazole. The term "lower alkyl" denotes an alkyl group having 1-10 carbon atoms.

Many of the benzotriazoles of this invention are available under the trademark designation Tinuvin 326, 327 and 328, Tinuvin P, etc. (See above.) They may be prepared by coupling an aromatic diazo compound with an aromatic amine, followed by oxidation of the coupled intermediate. An illustrative preparation is as follows:

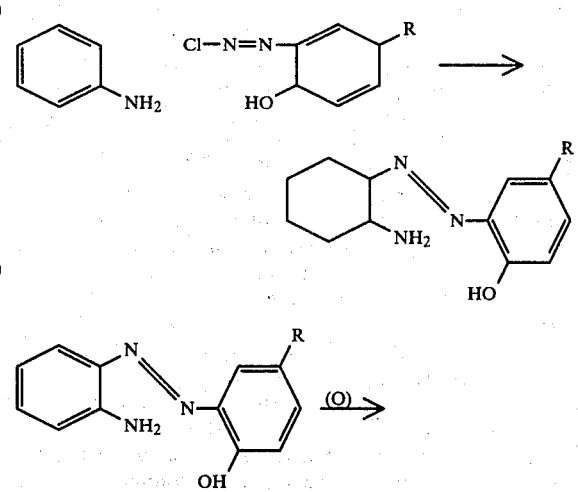

-continued

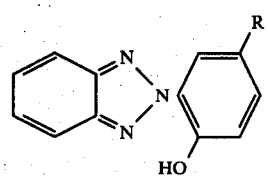

Other methods of preparation are set out in U.S. Pat. Nos. 3,004,896 (Heller et al.) and 3,189,615 (Heller et al.).

These benzotriazoles are used, for the purpose of this invention, in concentrations ranging from about 0.01 percent to about 5.0 percent. Best results are obtained at concentrations within the range of from about 0.1 percent to about 0.5 percent, based on the olefin polymer.

The bis-(dialkylphenyl)pentaerythritol diphosphite component of the combination of the invention may be either the spiro or the caged isomer, i.e.,

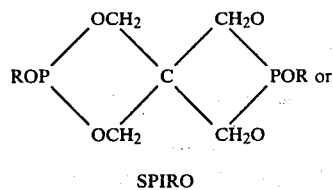

SPIRO

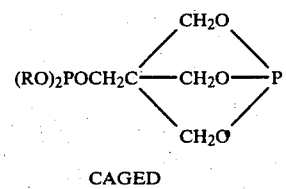

CAGED or it may be a mixture, in any proportion, of the two. R in the above equation is a dialkylphenyl groups of which the alkyl has 3–9 carbon atoms. Such a mixture can be prepared from the reaction of a dialkylphenol as the source of R, with diphenyl pentaerythritol diphosphite, which in turn may be prepared by the reaction of triphenyl phosphite with pentaerythritol. The alkyl groups preferably are bulky, i.e., tertiary or secondary alkyl groups. Such alkyl groups include isopropyl, sec-butyl, tertiarybutyl, n-amyl, tertiaryamyl, n-hexyl, 2,2-dimethylbutyl, 2-methyl-2-ethylpropyl, phenyl ethyl and tertiaryoctyl.

The two alkyl groups are in the 2,4-positions or 2,6-positions. A particularly preferred species is bis-(2,4-ditertiarybutylphenyl)pentaerythritol diphosphite. Another preferred species is bis-(2,6-ditertiarybutylphenyl)pentaerythritol diphosphite.

The relative proportions of the pentaerythritol diphosphite used herein range from about 0.05 percent to about 1.0 percent, based on the olefin polymer.

These stabilizing ingredients may be added to the olefin polymer in any conventional manner. They may, for example, be blended into the polymer as dry powders, or they may be dissolved in one or more solvents and sprayed onto finely divided polymer particles, or they may be blended as a melt in an extruder, or they may be mixed on a roll mill, or in a Banbury mixer.

Other additives can also be added to the olefin polymer including fillers, pigments, antistatic agents and the like. Metal stearates, for example, are commonly added as lubricants, or as neutralizers, or to impart a measure of heat stability to the polymer composition.

The olefin polymer compositions contemplated herein can be converted by extrusion, injection molding, blow molding and the like into a variety of molded objects, filaments, films, sheets, etc.

The efficacy of the additive combination of the invention is shown by the data set out in Table I below. The data is collected from tests carried out on 200/16 denier natural polypropylene multifilament. The fiber compositions are prepared by dry blending the various components and then extruding the mixture at 475° F. Fibers are spun at 540° F., drawn at a ratio of 7:1 and given one twist per inch. The test consists of exposure of the test fiber to conditions of ordinary weather. The tenacity retention of the fibers is monitored and when 50% of the original tenacity is lost the sample is adjudged a failure. The fiber test samples consist of polypropylene plus the indicated amounts of additives.

TABLE I

| Kilolangley | Test Samples | | |
|---|---|---|---|
| | (1) 0.3A* | (2) 0.15A 0.15B** | (3) 0.15A 0.15C*** |
| 25 | 50% | — | — |
| 28 | — | — | 50% |
| 37 | 36% | 74% | 33% |
| 42 | — | 50% | — |
| 50 | 0 | 14% | 0 |

*A is 2-(2'-hydroxy-3',5'-ditertiarybutylphenyl)-5-chlorobenzotriazole
**B is bis-(2,4-ditertiarybutylphenyl)pentaerythritol diphosphite
***C is distearyl pentaerythritol diphosphite It will be seen that Test Sample (2), representative of the present invention, is superior, in its resistance to the deteriorative influence of ultraviolet light, to both (1) and (3). Test Sample (1) contains twice as much of the 2-hydroxybenzotriazole as does Test Sample (2) and yet is less stable than the latter. Moreover, Test Sample (2) is superior in its UV stability to Test Sample (3) which is the combination shown in the above Valdiserri et al. patent.

All parts and percentages herein, unless otherwise expressly stated, are by weight.

I claim:

1. A polymer composition stabilized against deterioration in the presence of ultraviolet radiation comprising an olefin polymer and stabilizing amounts of (1) a hydroxyphenylbenzotriazole having the structural formula

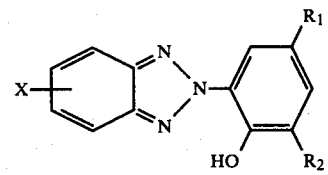

where $R_1$ is lower alkyl or halogen, $R_2$ is lower alkyl, halogen or hydrogen, and X is chlorine or hydrogen and (2) a bis-(dialkylphenyl)pentaerythritol diphosphite where the alkyl groups each contain 3–9 carbon atoms.

2. The polymer composition of claim 1 wherein the olefin polymer is a polymer of propylene.

3. The polymer composition of claim 1 wherein the olefin polymer is polypropylene.

4. The polymer composition of claim 1 wherein the alkyl groups in the bis-(dialkylphenyl)pentaerythritol diphosphite are bulky groups.

5. The polymer composition of claim 4 wherein the alkyl groups are tertiarybutyl groups.

6. The polymer composition of claim 1 wherein the bis-(dialkylphenyl)pentaerythritol diphosphite is a bis-(2,4-dialkylphenyl)pentaerythritol diphosphite.

7. The polymer composition of claim 1 wherein the hydroxyphenylbenzotriazole is 2-(2'-hydroxy-3',5'-ditertiarybutylphenyl)5-chlorobenzotriazole.

8. A polymer composition stabilized against deterioration in the presence of ultraviolet radiation comprising polypropylene and stabilizing amounts of (1) 2-(2'-hydroxy-3',5'-ditertiarybutylphenyl)5-chlorobenzotriazole and (2) a bis-(ditertiarybutylphenyl)pentaerythritol diphosphite.

* * * * *